US012676708B2

(12) United States Patent
Liu et al.

(10) Patent No.: US 12,676,708 B2
(45) Date of Patent: Jul. 7, 2026

(54) APPARATUS AND METHOD FOR TRANSMISSION CONFIGURATION INDICATION STATES

(71) Applicant: Lenovo (Beijing) Limited, Beijing (CN)

(72) Inventors: Bingchao Liu, Changping District (CN); Chenxi Zhu, Haidian Distric (CN); Wei Ling, Changping (CN); Lianhai Wu, Chaoyang (CN)

(73) Assignee: Lenovo (Beijing) Limited, Haidian District (CN)

( * ) Notice: Subject to any disclaimer, the term of this patent is extended or adjusted under 35 U.S.C. 154(b) by 334 days.

(21) Appl. No.: 17/637,329

(22) PCT Filed: Aug. 23, 2019

(86) PCT No.: PCT/CN2019/102321
§ 371 (c)(1),
(2) Date: Feb. 22, 2022

(87) PCT Pub. No.: WO2021/035423
PCT Pub. Date: Mar. 4, 2021

(65) Prior Publication Data
US 2022/0278787 A1      Sep. 1, 2022

(51) Int. Cl.
*H04L 5/00* (2006.01)
*H04W 72/231* (2023.01)
*H04W 72/51* (2023.01)
(52) U.S. Cl.
CPC ......... *H04L 5/0035* (2013.01); *H04W 72/231* (2023.01); *H04W 72/51* (2023.01)

(58) Field of Classification Search
None
See application file for complete search history.

(56) References Cited

U.S. PATENT DOCUMENTS

2019/0141693 A1* 5/2019 Guo ...................... H04L 5/0053
2019/0222284 A1 7/2019 Huang
(Continued)

FOREIGN PATENT DOCUMENTS

CN            109076364 A      12/2018
KR    10-2019-0036223      *   3/2019
(Continued)

OTHER PUBLICATIONS

Cirik—U.S. Appl. No. 62/841,777 (filed May 1, 2019 ) (Year: 2019).*
(Continued)

*Primary Examiner* — Andre Tacdiran
(74) *Attorney, Agent, or Firm* — FIG. 1 Patents

(57)                ABSTRACT

Apparatus and methods of Transmission Configuration Indication (TCI) states configuration and activation or deactivation for multiple DCI (M-DCI) based multiple TRP (M-TRP) Downlink (DL) transmission are disclosed. The apparatus includes: a receiver that receives a capability report from a remote device, wherein the capability report indicates that the remote device supports 128 or more configurable TCI states; a processor that configures 128 or more TCI states according to the capability report; and a transmitter that transmits a Media Access Control (MAC) Control Element (CE) to activate a subset of the TCI states.

16 Claims, 6 Drawing Sheets

(56) References Cited

U.S. PATENT DOCUMENTS

| | | | | |
|---|---|---|---|---|
| 2019/0273637 | A1* | 9/2019 | Zhang | H04B 5/72 |
| 2019/0312698 | A1* | 10/2019 | Akkarakaran | H04L 5/0048 |
| 2019/0342907 | A1* | 11/2019 | Huang | H04W 72/23 |
| 2019/0349059 | A1* | 11/2019 | John Wilson | H04W 72/0453 |
| 2020/0068548 | A1* | 2/2020 | Guan | H04W 72/23 |
| 2020/0154450 | A1* | 5/2020 | Zhou | H04W 72/542 |
| 2020/0314818 | A1* | 10/2020 | Jin | H04L 5/0096 |
| 2020/0314857 | A1* | 10/2020 | Pezeshki | H04W 72/53 |
| 2020/0322109 | A1* | 10/2020 | Yu | H04L 5/0023 |
| 2020/0351841 | A1* | 11/2020 | Cirik | H04B 7/0695 |
| 2020/0351892 | A1* | 11/2020 | Yi | H04W 72/53 |
| 2021/0105860 | A1* | 4/2021 | Tsai | H04W 72/1273 |
| 2022/0103288 | A1* | 3/2022 | Matsumura | H04L 5/0053 |
| 2022/0167322 | A1* | 5/2022 | Takahashi | H04B 7/0874 |
| 2022/0200687 | A1* | 6/2022 | Guo | H04L 5/0023 |
| 2022/0271890 | A1* | 8/2022 | Grossmann | H04L 5/0051 |

FOREIGN PATENT DOCUMENTS

| | | | |
|---|---|---|---|
| WO | WO2019171519 | A1 * | 1/2019 |
| WO | WO2021022498 | * | 2/2021 |

OTHER PUBLICATIONS

Guo—U.S. Appl. No. 62/886,043 (filed Aug. 13, 2019) (Year: 2019).*

Yi—U.S. Appl. No. 62/842,172 (filed May 2, 2019) (Year: 2019).*

Yu—U.S. Appl. No. 62/830,667 (filed Apr. 8, 2019) (Year: 2019).*

Zhou—U.S. Appl. No. 62/767,500 (filed Nov. 14, 2018) (Year: 2018).*

Tsai—U.S. Appl. No. 62/780,074 (filed Dec. 14, 2018) (Year: 2018).*

3GPP R1-1908194, TSG RAN WG1 Meeting #98. Prague, CZ, Aug. 26-30, 2019 (Year: 2019).*

"International Preliminary Report on Patentability", PCT Application No. PCT/CN2019/102321, Mar. 3, 2022, 5 pages.

"International Search Report and Written Opinion", PCT Application No. PCT/CN2019/102321, May 22, 2020, 6 pages.

CATT , "Further discussion on TCI state switching requirements", 3GPP TSG-RAN4#90bis Meeting, R4-1903226, R4-1903226, Xi'an, China [retrieved May 5, 2022]. Retrieved from the Internet <https://www.3gpp.org/ftp/tsg_ran/wg4_radio/TSGR4_90Bis/Docs>., Apr. 2019, 3 pages.

Mediatek Inc. , "Enhancements on multi-beam operations", 3GPP TSG RAN WG1 Meeting #95, R1-1812350, Spokane, WA, US [retrieved May 5, 2022]. Retrieved from Internet <https://www.3gpp.org/DynaReport/TDocExMtg- R1-95--18807.htm>., Nov. 2018, 9 pages.

19942770.9 , "Extended European Search Report", EP Application No. 19942770.9, Apr. 18, 2023, 8 pages.

Huawei , et al., "Introducing new MAC CEs for NR MIMO", 3GPP TSG-RAN WG2 NR Ad hoc 0118, R2-1801523, Vancouver, Canada [retrieved May 17, 2023]. Retrieved from the Internet <https://www.3gpp.org/ftp/tsg_ran/wg2_r12/TSGR2_AHs/2018_01_NR/Docs>., Jan. 2018, 7 Pages.

ZTE , "Further details on multi-beam/TRP operation", 3GPP TSG RAN WG1 Meeting #98, R1-1908194, Prague, CZ [retrieved May 17, 2023]. Retrieved from the Internet <https://www.3gpp.org/ftp/tsg_ran/WG1_RL1/TSGR1_98/Docs>., Aug. 2019, 17 Pages.

"Communication Pursuant to Article 94(3) EPC", EP Application No. 19942770.9, Mar. 24, 2025, 7 pages.

"Radio Resource Control (RRC) protocol specification (Release 15)", 3GPP; Technical Specification Group Radio Access Network; NR; 3GPP TS 38.331 V15.6.0 (Jun. 2019)., Jun. 2019, 519 pages.

"User Equipment (UE) radio access capabilities (Release 15)", 3GPP; Technical Specification Group Radio Access Network; NR; 3GPP TS 38.306 V15.6.0 (Jun. 2019)., Jun. 2019, 53 pages.

* cited by examiner

APPARATUS AND METHOD FOR TRANSMISSION CONFIGURATION INDICATION STATES

FIELD

The subject matter disclosed herein relates generally to wireless communication and more particularly relates to, but not limited to, apparatus and methods of Transmission Configuration Indication (TCI) states configuration and activation or deactivation for multiple Downlink Control Information (M-DCI) based multiple Transmit Receive Points (M-TRP) Downlink (DL) transmission.

BACKGROUND

The following abbreviations and acronyms are herewith defined, at least some of which are referred to within the following description.

Third Generation Partnership Project (3GPP), 5th Generation (5G), New Radio (NR), 5G Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Physical Downlink Control Channel (PDCCH), Physical Downlink Shared Channel (PDSCH), Physical Uplink Control Channel (PUCCH), Physical Uplink Shared Channel (PUSCH), Bandwidth Part (BWP), Control Element (CE), Control Resource Set (CORESET), Channel State Information Reference Signal (CSI-RS), Downlink Control Information (DCI), Demodulation Reference Signal (DMRS or DM-RS), Identification (ID), Logical Channel ID, or Logical Channel Index (LCID), Media Access Control (MAC), Reference Signal (RS), Transmit Receive Point (TRP), Frequency Range 1 (FR1), Frequency Range 2 (FR2), Transmission Configuration Indication (TCI), Quasi Co-Location (QCL), Multiple DCI (M-DCI), Multiple TRP (M-TRP), Radio Resource Control (RRC).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

In NR Release 15, only downlink transmission from a single Transmit Receive Point (TRP) is supported. NR Release 16 will support multiple TRPs. Enhancements on multi-TRP transmission including improved reliability and robustness with both ideal and non-ideal backhaul between these TRPs are studied for NR Release 16. A TRP is an apparatus to transmit and receive signals, and is controlled by a gNB through the backhaul between the gNB and the TRP.

SUMMARY

According to a first aspect, there is provided an apparatus comprising: a receiver that receives a capability report from a remote device, wherein the capability report indicates that the remote device supports 128 or more configurable Transmission Configuration Indication (TCI) states; a processor that configures 128 or more TCI states according to the capability report; and a transmitter that transmits a Media Access Control (MAC) Control Element (CE) to activate a subset of the TCI states.

According to a second aspect, there is provided an apparatus comprising: a transmitter that transmits a capability report, wherein the capability report indicates that the apparatus supports 128 or more configurable Transmission Configuration Indication (TCI) states; and a receiver that receives a Media Access Control (MAC) Control Element (CE) for activating a subset of the TCI states.

According to a third aspect, there is provided a method comprising: receiving, by a receiver, a capability report from a remote device, wherein the capability report indicates that the remote device supports 128 or more configurable Transmission Configuration Indication (TCI) states; configuring, by a processor, 128 or more TCI states according to the capability report; and transmitting, by a transmitter, a Media Access Control (MAC) Control Element (CE) to activate a subset of the TCI states.

According to a fourth aspect, there is provided a method comprising: transmitting, by a transmitter, a capability report, wherein the capability report indicates that 128 or more configurable Transmission Configuration Indication (TCI) states are supported; and receiving, by a receiver, a Media Access Control (MAC) Control Element (CE) for activating a subset of the TCI states.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
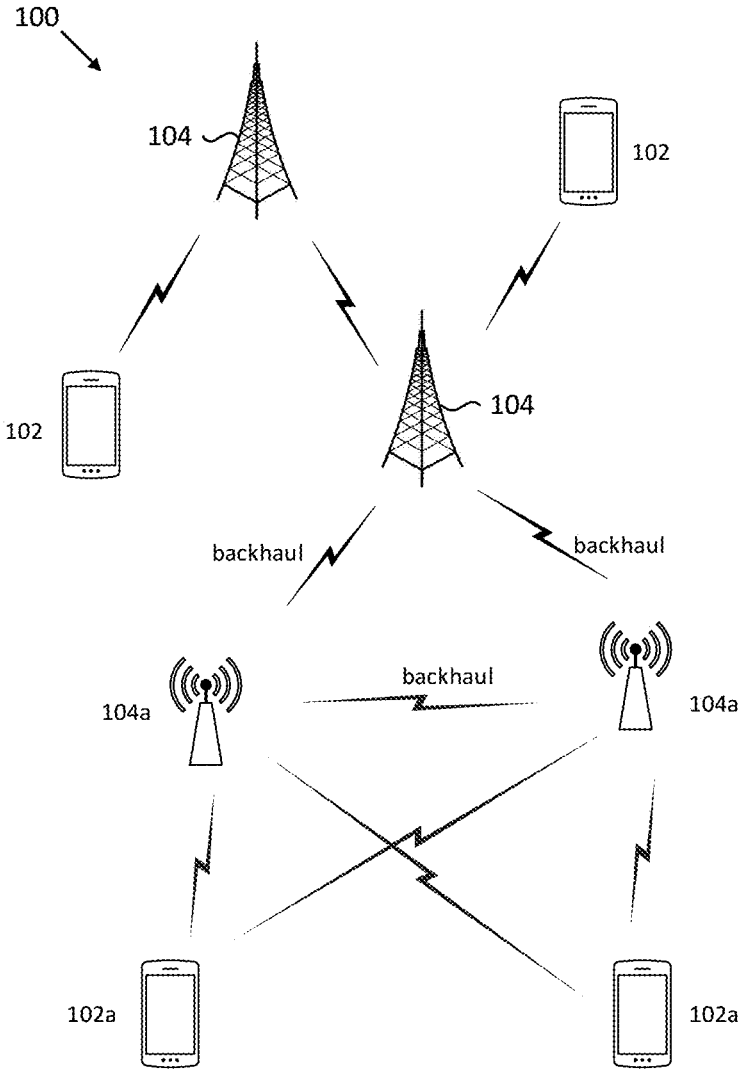
FIG. 1 is a schematic diagram illustrating a wireless communication system.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable Compact Disc Read-Only Memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions or acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100 with multiple TRPs 104*a*. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

The NE 104 may also include one or more transmit receive points (TRPs) 104*a*. In some embodiments, the network equipment may be a gNB 104 that controls a number of TRPs 104*a*. In addition, there is a backhaul between two TRPs 104*a*. In some other embodiments, the network equipment may be a TRP 104*a* that is controlled by a gNB.

Direct or indirect communication link between two or more NEs 104 may be provided.

Communication links are provided between the NEs 104, 104*a* and the UEs 102, 102*a*, respectively, which, for example, may be NR UL or DL communication links. Some UEs 102, 102*a* may simultaneously communicate with different Radio Access Technologies (RATs), such as NR and LTE.

In some embodiments, the UE 102*a* may be able to communicate with two or more TRPs 104*a* that utilize a non-ideal backhaul, simultaneously. A TRP may be a transmission point of a gNB. Multiple beams may be used by the UE and/or TRP(s). The two or more TRPs may be TRPs of different gNBs, or a same gNB.

Figure 2:
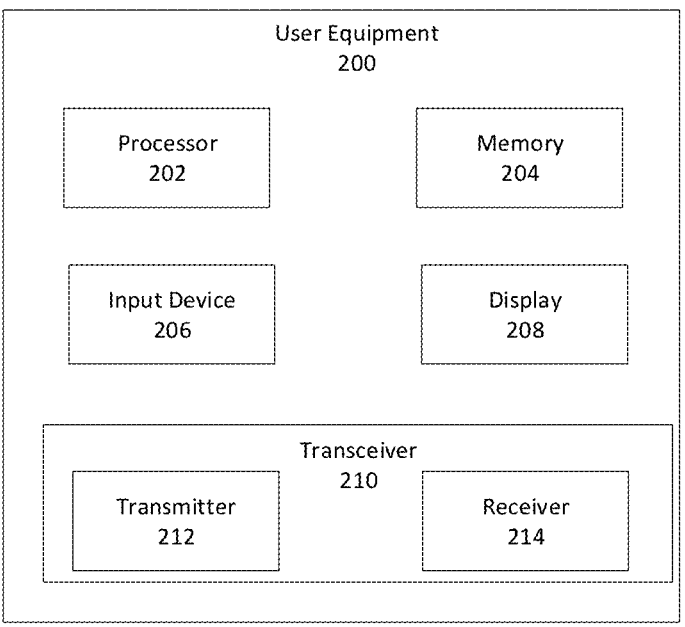
FIG. 2 is a schematic block diagram illustrating components of user equipment (UE) according to one embodiment.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or a similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and the display 208 may form a touchscreen or a similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
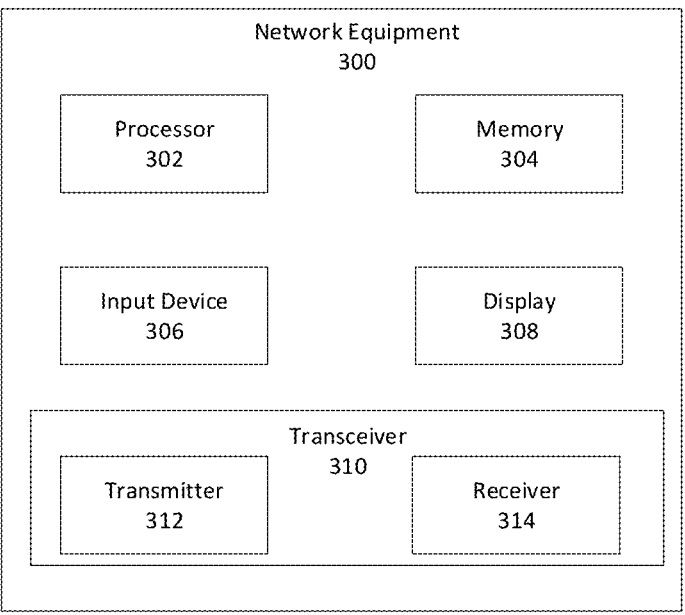
FIG. 3 is a schematic block diagram illustrating components of network equipment (NE) according to one embodiment.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. For example, the processor 302 may control the transceiver 310 to receive a PUCCH resource and/or a PUSCH resource. In another example, the processor 302 may control the transceiver 310 to transmit DL signals containing various configuration data to the UE 200, as described above.

The transceiver 310, in one embodiment, is configured to communicate wirelessly with the UE 200. In certain embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, wherein the transceiver 310 includes a transmitter 312 and a receiver 314 for each cell or cell sector.

In NR Release 15, up to 128 TCI states may be configured for a UE in a cell by the gNB based on the UE capability reporting. Each TCI-State contains parameters for configuring a quasi co-location (QCL) relationship between one or two downlink reference signals and the Demodulation Reference Signal (DM-RS) ports of the Physical Downlink Shared Channel (PDSCH), the DM-RS port of Physical Downlink Control Channel (PDCCH), or the Channel State Information Reference Signal (CSI-RS) port(s) of a CSI-RS resource. Out of the 128 configured TCI states, 8 of them may be activated by one MAC CE and be mapped to the codepoints of the DCI field 'Transmission Configuration Indication (TCI)' transmitted from the gNB. The UE can determine the QCL (Quasi Co-Location) assumption for the PDSCH reception according to the activated TCI states and the value of the TCI field in the scheduling DCI.

In NR Release 16, multiple DCI (M-DCI) based multiple TRP (M-TRP) DL transmission will be supported for multiple TRPs scenario with non-ideal backhaul among TRPs. Each TRP may transmit independent DCI to schedule independent PDSCH and each TRP may need independent activated 8 TCI states for the cell coverage, and therefore more than 8 TCI states out of the configured 128 or more TCI state are required to be activated for the scenario that multiple TRPs communicate with one UE.

Figure 4:
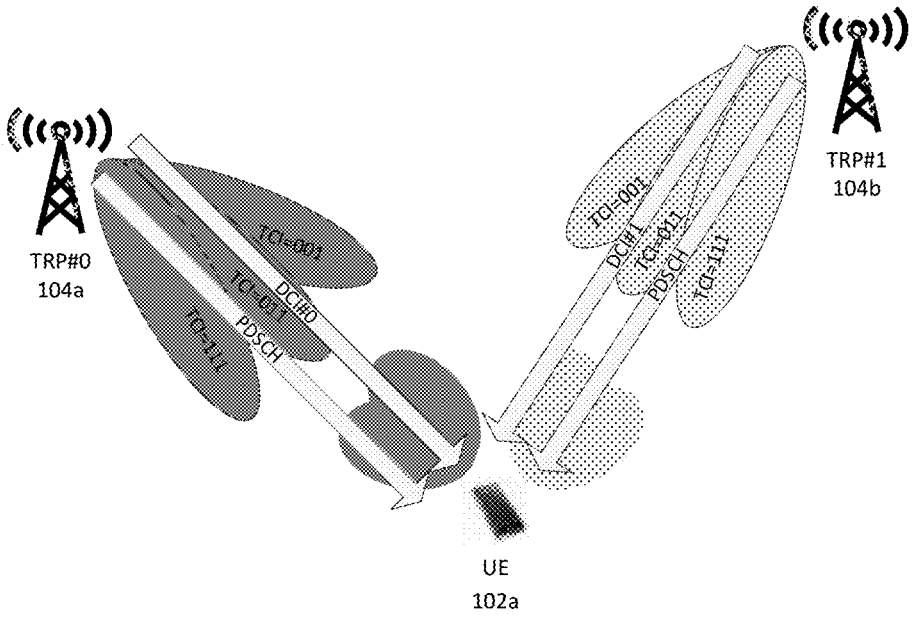
FIG. 4 is a schematic diagram illustrating M-DCI based M-TRP DL transmissions according to one embodiment.

FIG. 4 is a schematic diagram illustrating M-DCI based M-TRP DL transmissions according to one embodiment. In this embodiment, for example, two TRPs, i.e. TRP#0 104a and TRP#1 104b are in communication with a UE 102a. Two DCIs are transmitted, one is DCI#0 from TRP#0 104a, and the other is DCI#1 from TRP#1 104b. Different beams illustrated in FIG. 4 correspond to different QCL assumptions with type-D defined in TS38.214. QCL assumptions corresponding to different beams transmitted by one TRP should be indicated by the TCI field in DCI format 1_1 with different values. However, QCL assumptions corresponding beams transmitted by different TRPs may be indicated by the same TCI field value. Thus, the same TCI field value may be carried by different DCIs that are transmitted by different TRPs. For example, beams transmitted by TRP#0 and TRP#1 may both be indicated by the TCI fields with the same values, e.g. TCI=001, 011 and 111. Accordingly, the same TCI field value, '001' for example, may correspond to different QCL assumptions for the reception of PDSCH transmitted form TRP#0 and PDSCH transmitted from TRP#1. The UE should be able to apply different TCI states for the reception of PDSCH transmission indicated by PDSCH#0 and the PDSCH transmission indicated by PDSCH#1, that are transmitted by TRP#0 and TRP#1 respectively, although the scheduling DCI#0 and DCI#1 carry the same TCI field value.

A CORESET comprises a set of time-frequency resources to transmit a Downlink Control Information (DCI), and each CORESET can only be configured to correspond to one TRP. Therefore, each TRP may be associated with a CORESET group, or may be identified by a CORESET group.

In some embodiments, the UE may be configured with a list of up to M TCI-State configurations within the higher layer parameter PDSCH-Config to decode PDSCH according to a detected PDCCH with DCI intended for the UE, where M depends on the UE capability maxNumberActiveTCI-PerBWP. For example, M may equal to 128 in some embodiments, or 64 in some other embodiments. Each TCI-State contains parameters for configuring a quasi co-location (QCL) relationship between one or two downlink reference signals and the Demodulation Reference Signal (DM-RS) ports of the PDSCH, the DM-RS port of PDCCH, or the Channel State Information Reference Signal (CSI-RS) port(s) of a CSI-RS resource.

The UE receives an activation command used to map up to 8 TCI states to the codepoints of the DCI field 'Transmission Configuration Indication'. If the higher layer parameter tci-PresentInDCI is set as 'enabled', the TCI field in DCI format 1_1 in the scheduling component carrier points to the activated TCI states in the scheduled component carrier or DL Bandwidth Part (BWP), the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL determined by the reported UE capability.

Figure 5:
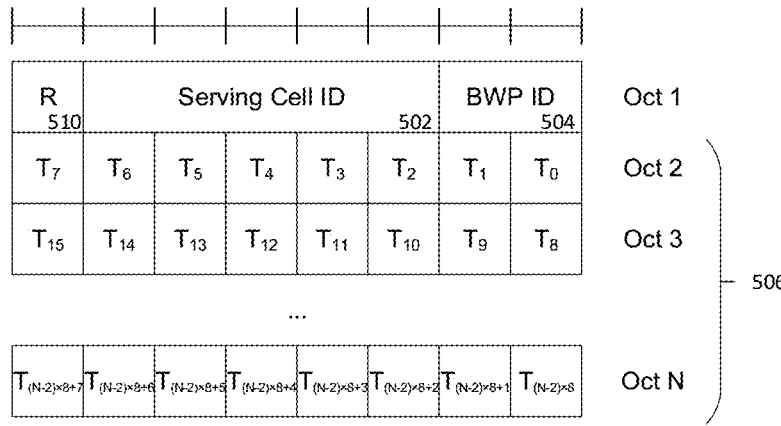
FIG. 5 is a schematic diagram illustrating TCI states activation or deactivation for UE specific Physical Downlink Shared Channel (PDSCH) MAC CE according to one embodiment.

FIG. 5 is a schematic diagram illustrating TCI states activation or deactivation for UE specific PDSCH MAC CE according to one embodiment. The TCI states activation or deactivation for UE specific PDSCH MAC CE is identified by a MAC subheader with dedicate Logical Channel Identification (LCID) as shown in FIG. 5. It has a variable size having the following fields:

Serving Cell ID 502: This field indicates the identity of the Serving Cell for which the MAC CE applies. The length of the field is 5 bits;

BWP ID 504: This field indicates a DL BWP for which the MAC CE applies. The length of the BWP ID field is 2 bits;

$T_i$ 506: If there is a TCI state with TCI-StateId i, this field indicates the activation or deactivation status of the TCI state with TCI-StateId i, otherwise MAC entity shall ignore the $T_i$ field. The $T_i$ field is set to 1 to indicate that the TCI state with TCI-StateId i shall be activated and mapped to the codepoint of the DCI Transmission Configuration Indication field. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states is 8;

R 510: Reserved bit, set to 0.

In some other embodiments, more than 128 TCI states, e.g. 256 TCI states, may be configured for a UE in a cell for M-DCI based M-TRP DL transmission based on the UE capability reporting. Accordingly, there may be 256 configurable TCI states. Different TRPs may be associated with different TCI states.

Two methods of indicating TCI states in DCI format 1_1 are provided. The first method is to use a common set of TCI states to indicate TCIs for all the TRPs, while each TRP only indicates in its DCI the TCI states that are transmitted from itself.

Because of the larger number of total TCI states from multiple TRPs, this method requires to increase the bit width of TCI field in DCI format 1_1 and the maximum number of activated TCI states by one MAC CE. Each TRP can only indicate those TCI states associated with itself in the TCI field of DCI format 1_1.

This method extends the TCI states activation or deactivation for UE specific PDSCH MAC CE and the TCI field in DCI format 1_1. For example, the bit width of the TCI field in DCI format 1_1 may be configured as 4 by higher layers if higher layer parameter tci-PresentInDCI is enabled. The maximum number of activated TCI states for each BWP group is 16. Each TCI field value may only be indicated by the DCI transmitted from one TRP by the network coordination.

In this example, 256 TCI states are configured for one UE in a Component Carrier (CC) and 16 of them may be activated by a MAC CE. The 4-bit TCI fields are configured by higher layers for M-DCI based M-TRP DL transmission. The TCI fields with values from '0000' to '0111' may only be carried by the DCI transmitted from one TRP and the TCI fields with values from '1000' to '1111' may only be carried by the DCI transmitted from another TRP according to the network coordination or implementation.

The second method is interpreting the TCI field in the DCI format 1_1 in a TRP-specific manner. For M-DCI based M-TRP transmission, the TCI fields in the DCIs with format 1_1 transmitted from different TRPs are interpreted differently depending on which TRP sends the DCI. This does not require additional bits in the TCI field, but requires the TCI field to be configured or activated by a MAC CE in a TRP-specific manner. Only TCI states associated with a TRP is activated by the MAC CE for that TRP.

In NR Release 15, up to 8 TCI states, which are mapped to the codepoints of the 3-bits DCI field 'Transmission Configuration Indication', out of the configured 128 TCI states, can be activated for one BWP by one MAC CE. Considering that multiple DCIs may be transmitted by different TRPs for one UE, different TCI state lists can be activated for different TRPs in one BWP. A remaining issue is how to identify different DCIs transmitted from different TRPs. One solution is explicitly configuring different CORESET groups corresponding to different TRPs.

Figure 6:
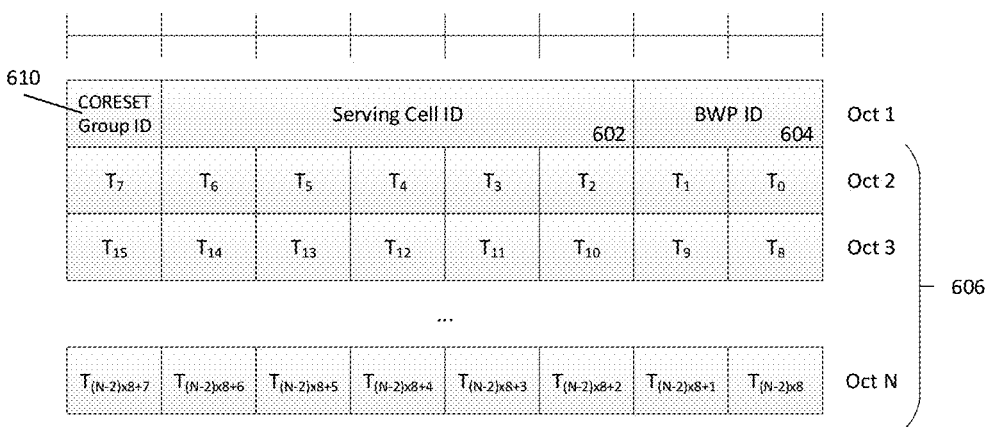
FIG. 6 is a schematic diagram illustrating TCI states activation or deactivation for UE specific PDSCH for a Control Resource Set (CORESET) group MAC CE according to one embodiment.

FIG. 6 is a schematic diagram illustrating TCI states activation or deactivation for UE specific PDSCH for a CORESET group MAC CE according to one embodiment. One or more CORESET groups which comprise one or more CORESETs may be configured for one UE in a BWP. Each CORESET group may correspond to one TRP. The TCI states for dynamic PDSCH QCL indication are activated per CORESET group. The DCI format 1_1 with 3 bits Transmission Configuration Indication field is re-used. A CORESET group ID 610 is introduced in the TCI states activation or deactivation for UE specific PDSCH for a CORESET group MAC CE as shown in FIG. 6.

The TCI states activation or deactivation for UE specific PDSCH for a CORESET group MAC CE is identified by a MAC subheader with dedicated LCID shown in FIG. 6. It has a variable size having the following fields:

CORESET Group ID or CORESET ID 610: This field indicates the identity of the CORESET group for which the MAC CE applies. If CORESET groups are configured, this field indicates the CORESET group ID; otherwise, this field should indicate ID of the CORESET with the lowest CORESET ID among the CORESETs associated with one TRP;

Serving Cell ID 602: This field indicates the identity of the Serving Cell for which the MAC CE applies. The length of the field is 5 bits;

BWP ID 604: This field indicates a DL BWP for which the MAC CE applies. The length of the BWP ID field is 2 bits;

$T_i$ 606: This field indicates the activation or deactivation status of the TCI state with TCI-StateId i. The $T_i$ field is set to 1 to indicate that the TCI state with TCI-StateId i shall be activated and mapped to the codepoint of the DCI Transmission Configuration Indication field. The $T_i$ field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states for each CORESET group is 8.

Figure 7:
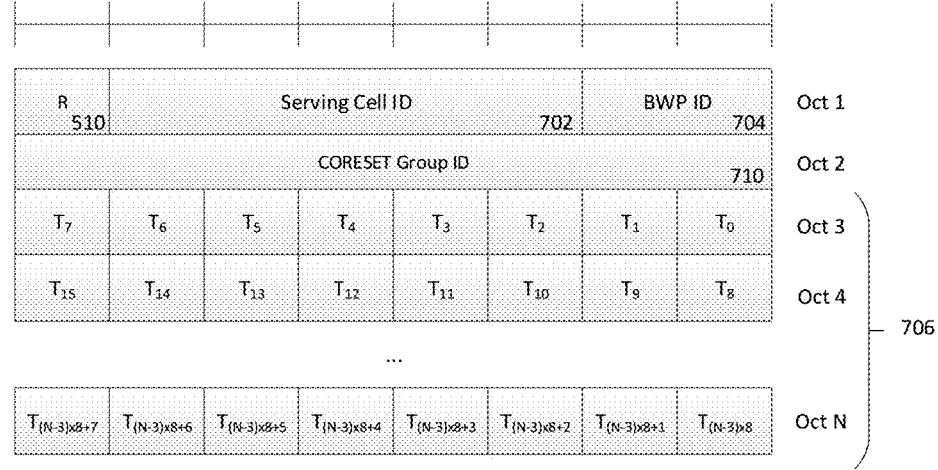
FIG. 7 is a schematic diagram illustrating TCI states activation or deactivation for UE specific PDSCH for a CORESET group MAC CE according to another embodiment.

FIG. 7 shows another example of a MAC subheader with dedicated LCID that identifies the TCI states activation or deactivation for UE specific PDSCH for a CORESET group MAC CE. The MAC subheader with dedicated LCID has a variable size including a field of CORESET Group ID or CORESET ID 710 which has a length of up to 8 bits. Thus, the TCI fields in the DCIs with format 1_1 transmitted from more than 2 TRPs can be interpreted by the UE. In some embodiments, the TCI states activation or deactivation for UE specific PDSCH for a CORESET group MAC CE has a variable size having the fields of: Serving Cell ID 702, BWP ID 704, $T_i$ 706, as well as a reserved bit R 510 similar to FIG. 5.

For the case that CORESET groups are not explicitly configured, all CORESETs transmitted from one TRP can be treated as being in a CORESET group and the lowest CORESET-ID within the CORESET group may be used as the CORESET group ID. In such case, the CORESET Group ID field in the MAC CE is the CORESET ID field.

The Transmission Configuration Indication field in DCI format 1_1 points to the TCI states activated for the CORESET group transmitting this DCI; and when the PDSCH is scheduled by DCI format 1_1, the UE shall use the TCI-State according to the value of the Transmission Configuration Indication field in the detected PDCCH with DCI for determining PDSCH antenna port quasi co-location.

In one embodiment, there are two CORESET groups, e.g. CORESET-Group#0 and CORESET-Group#1, and 256 TCI states are configured for one UE. For illustration purpose, it is assumed that the following TCI states are activated for each CORESET group:

Activated TCI states for CORESET-Group#0::={TCI state#2, TCI state#6, TCI state#8, TCI state#16, TCI state#22, TCI state#88, TCI state#108, TCI state#126}; and each is associated with the Transmission Configuration Indication field with a value as shown below.

| TCI State ID | TCI field value |
|---|---|
| TCI state#2 | 000 |
| TCI state#6 | 001 |
| TCI state#8 | 010 |
| TCI state#16 | 011 |
| TCI state#22 | 100 |
| TCI state#88 | 101 |
| TCI state#108 | 110 |
| TCI state#126 | 111 |

Activated TCI states for CORESET-Group#1::={TCI state#132, TCI state#156, TCI state#158, TCI state#166, TCI state#168, TCI state#188, TCI state#208, TCI state#226}; and each is associated with the Transmission Configuration Indication field with a value as shown below.

| TCI State ID | TCI field value |
|---|---|
| TCI state#132 | 000 |
| TCI state#156 | 001 |
| TCI state#158 | 010 |
| TCI state#166 | 011 |
| TCI state#168 | 100 |
| TCI state#188 | 101 |
| TCI state#208 | 110 |
| TCI state#226 | 111 |

If the UE receives a DCI transmitted on the time-frequency resources identified by a CORESET belongs to CORESET-Group#0 carrying a Transmission Configuration Indication field with value '011', the UE will receive the scheduled PDSCH by using the QCL information indicated by TCI state#16. If the UE receives a DCI transmitted on the time-frequency resources identified by a CORESET belongs to CORESET-Group#1 carrying a Transmission Configuration Indication field with value '011', the UE will receive the scheduled PDSCH by using the QCL information indicated by TCI state#166.

In order to reduce the MAC CE overhead, different TCI groups can be defined for different CORESET groups.

Figure 8:
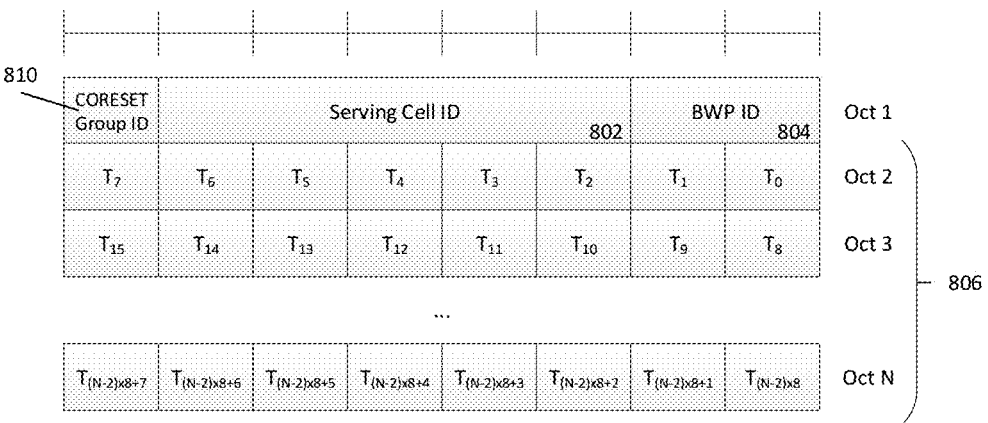
FIG. 8 is a schematic diagram illustrating TCI states activation or deactivation for UE specific PDSCH for a CORESET group MAC CE based on TCI group according to one embodiment.

FIG. 8 is a schematic diagram illustrating TCI states activation or deactivation for UE specific PDSCH for a CORESET group MAC CE based on TCI group. In one embodiment, 256 TCI states are configured by higher layers, and the TCI groups can be defined as:

TCI-Group#0::={TCI state#0, TCI state#1, . . . , TCI state#127};

TCI-Group#1::={TCI state#128, TCI state#1, . . . , TCI state#255}.

Each TCI group is associated with a CORESET group, e.g. TCI-Group#0 is associated with CORESET-Group#0 and TCI-Group#1 is associated with CORESET-Group#1.

The TCI states activation or deactivation for UE specific PDSCH MAC CE for each CORESET group is provided in FIG. 8.

The TCI states activation or deactivation for UE specific PDSCH for a CORESET group MAC CE is identified by a MAC subheader with dedicated LCID. It has a variable size having the following fields:

CORESET Group ID or TCI state ID 810: This field indicates the identity of the CORESET group for which the MAC CE applies. If CORESET groups are configured, this field indicates the CORESET group ID; otherwise, this field should indicate ID of the CORESET with the lowest CORESET ID among the CORESETs associated with one TRP.

Serving Cell ID 802: This field indicates the identity of the Serving Cell for which the MAC CE applies. The length of the field is 5 bits;

BWP ID 804: This field indicates a DL BWP for which the MAC CE applies. The length of the BWP ID field is 2 bits;

$T_i$ 806: This field indicates the activation or deactivation status of the $i^{th}$ TCI state within the TCI group associated with the CORESET group indicated by the CORESET group ID field. The $T_i$ field is set to 1 to indicate that the $i^{th}$ TCI state within the TCI group associated with the CORESET group indicated by the CORESET group ID field shall be activated and mapped to the codepoint of the DCI Transmission Configuration Indication field. The $T_i$ field is set to 0 to indicate that the $i^{th}$ TCI state within the TCI group associated with the CORESET group indicated by the CORESET group ID field shall be deactivated and is not mapped to the codepoint of the DCI Transmission Configuration Indication field. The codepoint to which the TCI State is mapped is determined by its ordinal position among all the TCI States with $T_i$ field set to 1, i.e. the first TCI State with $T_i$ field set to 1 shall be mapped to the codepoint value 0, second TCI State with $T_i$ field set to 1 shall be mapped to the codepoint value 1 and so on. The maximum number of activated TCI states for each CORESET group is 8.

For example, if the UE receives a MAC CE to activate the $1^{st}$, $8^{th}$, $28^{th}$, $36^{th}$, $58^{th}$, $66^{th}$, $88^{th}$ and $106^{th}$ TCI states within TCI-Group#1, the Transmission Configuration Indication fields carried by DCI format 1_1 transmitted from CORESET#1 with the values '000', '001', '010', '011', '100', '101', '110', '111' will point to TCI state#128, TCI state#135, TCI state#155, TCI state#163, TCI state#185, TCI state#193, TCI state#215, and TCI state#233, respectively.

Figure 9:
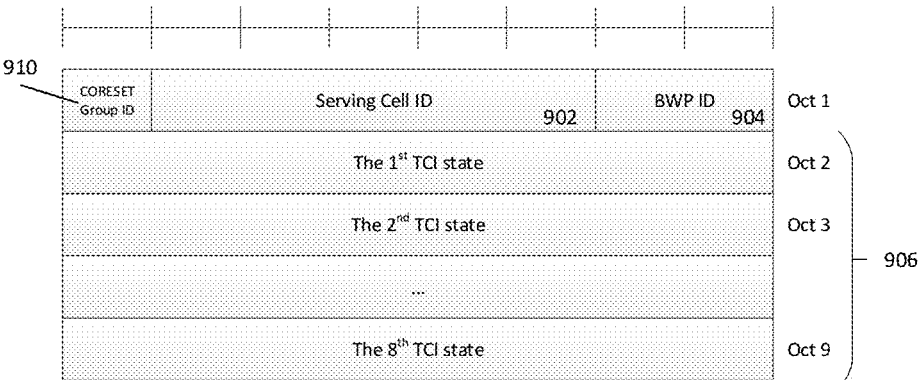
FIG. 9 is a schematic diagram illustrating TCI states activation or deactivation for UE specific PDSCH for a CORESET group MAC CE according to a further embodiment.

FIG. 9 is a schematic diagram illustrating TCI states activation or deactivation for UE specific PDSCH for a CORESET group MAC CE according to a further embodiment. This embodiment may further reduce the overhead of MAC CE. The $n^{th}$ TCI state for the Transmission Configuration Indication field with a value n−1 is directly indicated by an 8-bit field.

Similar to other embodiments, the TCI states activation or deactivation for UE specific PDSCH for a CORESET group MAC CE is identified by a MAC subheader with dedicated LCID. It has a variable size having the fields of: CORESET Group ID or CORESET ID 910, Serving Cell ID 902, BWP ID 904. However, instead of having the Ti field, it includes eight TCI state ID fields 906, each having a length of 8 bits.

For both the cases when tci-PresentInDCI='enabled' and tci-PresentInDCI is not configured in RRC connected mode, if the offset between the reception of the DL DCI and the corresponding PDSCH is less than the threshold timeDurationForQCL, the UE may assume that the DM-RS ports of PDSCH are QCLed with the RS(s) with respect to the QCL parameter(s) used for PDCCH QCL indication of the CORESET associated with a monitored search space with the lowest CORESET ID in the latest slot in which one or more CORESETs exists within the corresponding CORESET group.

In some further embodiments, two CORESET groups, i.e. CORESET-Group#0 and CORESET-Group#1, are defined as follows:

TRP#0: CORESET-Group#0::={CORESET#0, CORESET#1, CORESET#2}

TRP#1: CORESET-Group#1::={CORESET#3, CORESET#4}.

When tci-PresentInDCI='enabled' is configured for all CORESETs in RRC mode, if the offset between the reception of DCI transmitted on the time-frequency resources identified by CORESET#2 and the corresponding PDSCH is less than the threshold, the UE will determine the QCL for the scheduled PDSCH based on the TCI state configured for CORESET#0. If the offset between the reception of DCI transmitted on the time-frequency resources identified by CORESET#4 and the corresponding PDSCH is less than the threshold, the UE will determine the QCL for the scheduled PDSCH based on the TCI state configured for CORESET#3.

In some embodiments, the gNB may configure an index for each CORESET by higher layers. For example, all CORESETs within a first CORESET group may have a first index value, whereas all CORESETs within a second CORESET group may have a second index value. Accordingly, the index value of a CORESET may also be used to identify a CORESET group to which the CORESET belongs. In some other embodiments, the "CORESET Group ID" field 610, 710, 810, and 910 as shown in FIGS. 6-9 may be replaced by a field of index value of the CORESETs, or any other values that may be used to directly or indirectly identify a CORESET group, or a TRP from which the CORESETs are transmitted.

15
16

Figure 10:
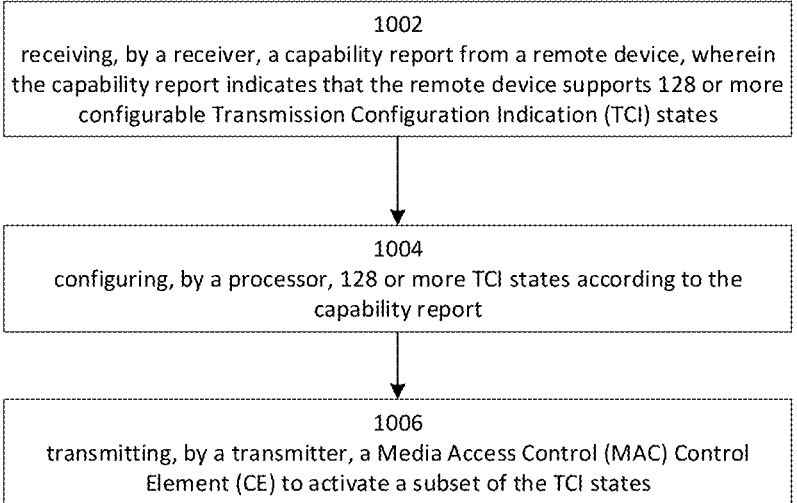
FIG. 10 is a flow chart illustrating steps of TCI states configuration and activation or deactivation for M-DCI based M-TRP DL transmission by a gNB according to one embodiment.

FIG. 10 is a flow chart illustrating steps of TCI states configuration and activation or deactivation for M-DCI based M-TRP DL transmission by a gNB.

At Step 1002, the receiver 314 on the gNB side receives a capability report from a remote device (e.g. a UE), where the capability report indicates that the remote device supports 128 or more configurable Transmission Configuration Indication (TCI) states.

At Step 1004, the processor 302 on the gNB side configures 128 or more TCI states according to the capability report.

At Step 1006, the transmitter 312 on the gNB side transmits a Media Access Control (MAC) Control Element (CE) to activate a subset of the TCI states.

Figure 11:
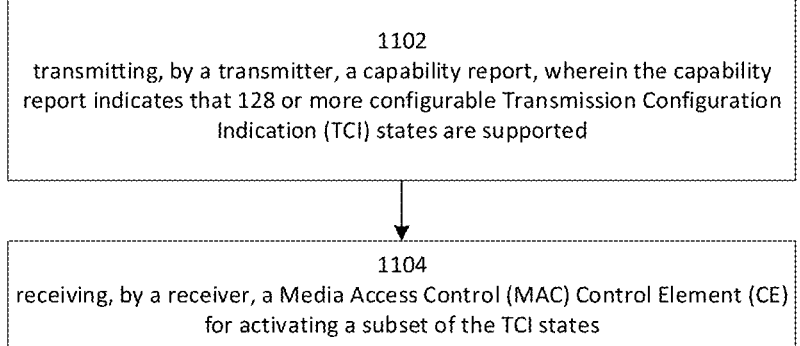
FIG. 11 is a flow chart illustrating steps of TCI states configuration and activation or deactivation for M-DCI based M-TRP DL transmission by a UE according to one embodiment.

FIG. 11 is a flow chart illustrating steps of TCI states configuration and activation or deactivation for M-DCI based M-TRP DL transmission by a UE.

At step 1102, the transmitter 212 on the UE side transmits a capability report, which indicates that 128 or more configurable Transmission Configuration Indication (TCI) states are supported.

At step 1104, the receiver 214 on the UE side receives a Media Access Control (MAC) Control Element (CE) for activating a subset of the TCI states.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A base station for wireless communication, comprising:
at least one memory; and
at least one processor coupled with the at least one memory and configured to cause the base station to:
receive a capability report from a remote device, wherein the capability report indicates that the remote device supports 128 or more configurable transmission configuration indication (TCI) states;
configure a set of 128 or more TCI states according to the capability report; and
transmit a media access control control element (MAC-CE) to activate a subset of the set of TCI states,
wherein a quantity of TCI states in the subset activated by the MAC-CE is greater than eight,
wherein the TCI states in the subset are associated with a control resource set (CORESET) group of a plurality of CORESET groups,
wherein the MAC-CE comprises the following fields:
a CORESET group identification field, and
a serving cell identification field, and
a bandwidth part identification field, and
one or more TCI state fields, wherein each TCI state field indicates a TCI state to be activated,
wherein a first set of TCI state field values are associated with a first CORESET group of the plurality of CORESET groups and a second set of TCI state field values are associated with a second CORESET group of the plurality of CORESET groups, and wherein CORESETs belonging to a same CORESET group are configured with a same index value.

2. The base station of claim 1, wherein the TCI states in the subset are associated with the plurality of CORESET groups including the CORESET group, and each CORESET group of the plurality of CORESET groups comprises one or more CORESETs that are configured for a same transmit receive point.

3. The base station of claim 2, wherein the CORESET group identification field comprises a CORESET identification.

4. The base station of claim 3, wherein the CORESET identification is a lowest CORESET identification among the plurality of CORESETs configured for the same transmit receive point.

5. The base station of claim 2, wherein the at least one processor is further configured to cause the base station to configure a plurality of TCI groups, and each TCI group comprises a plurality of configured TCI states that are associated with one of the CORESET groups of the plurality of CORESET groups.

6. The base station of claim 1, wherein the TCI states in the subset are associated with a plurality of CORESETs configured with a same index value.

7. The base station of claim 6, wherein the MAC-CE comprises an index value.

8. The base station of claim 1, wherein the MAC-CE comprises eight TCI state identifiers, each TCI state identifier indicating a TCI state to be activated.

9. A user equipment (UE) for wireless communication, comprising:
at least one memory; and
at least one processor coupled with the at least one memory and configured to cause the UE to:
transmit a capability report, wherein the capability report indicates that the UE supports a set of 128 or more configurable transmission configuration indication (TCI) states; and
receive a media access control control element (MAC-CE) for activating a subset of the set of TCI states,
wherein a quantity of TCI states in the subset activated by the MAC-CE is greater than eight,
wherein the TCI states in the subset are associated with a control resource set (CORESET) group of a plurality of CORESET groups,
wherein the MAC-CE comprises the following fields:
a CORESET group identification field, and
a serving cell identification field, and
a bandwidth part identification field, and
one or more TCI state fields, wherein each TCI state field indicates a TCI state to be activated,
wherein a first set of TCI state field values are associated with a first CORESET group of the plurality of CORESET groups and a second set of TCI state field values are associated with a second CORESET group of the plurality of CORESET groups, and
wherein CORESETs belonging to a same CORESET group are configured with a same index value.

10. The UE of claim 9, wherein the CORESET group identification field comprises a CORESET identification.

11. The UE of claim 10, wherein the CORESET group comprises one or more CORESETs that are associated with a same transmit receive point.

12. The UE of claim 9, wherein the TCI states in the subset are associated with a plurality of CORESETs configured with a same index value.

13. The UE of claim 12, wherein the MAC-CE comprises an index value.

14. The UE of claim 9, wherein the at least one processor is further configured to cause the UE to determine a quasi co-location for a physical downlink shared channel reception based on a TCI state configured for a CORESET with a lowest CORESET identifier among the CORESETs configured for a same transmit receive point when a higher layer parameter tci-PresentInDCI is set to enabled and an offset between reception of a downlink control information and a corresponding physical downlink shared channel is less than a threshold.

15. A method performed by a base station, the method comprising:

receiving a capability report from a remote device, wherein the capability report indicates that the remote device supports 128 or more configurable transmission configuration indication (TCI) states;

configuring a set of 128 or more TCI states according to the capability report; and transmitting a media access control control element (MAC-CE) to activate a subset of the set of TCI states, wherein the TCI states in the subset are associated with a control resource set (CORESET) group of a plurality of CORESET groups, wherein the MAC-CE comprises the following fields:

a CORESET group identification field, and a serving cell identification field, and a bandwidth part identification field, and one or more TCI state fields, wherein each TCI state field indicates a TCI state to be activated, wherein a first set of TCI state field values are associated with a first CORESET group of the plurality of CORESET groups and a second set of TCI state field values are associated with a second CORESET group of the plurality of CORESET groups, and wherein CORESETs belonging to a same CORESET group are configured with a same index value.

16. The method of claim 15, wherein the TCI states in the subset are associated with the plurality of CORESET groups including the CORESET group, and each CORESET group of the plurality of CORESET groups comprises one or more CORESETs that are configured for a same transmit receive point.

* * * * *